United States Patent
Correa et al.

(10) Patent No.: US 9,346,243 B2
(45) Date of Patent: May 24, 2016

(54) NON-COMBUSTIBLE COMPOSITE PANEL AND MANUFACTURING METHOD

(75) Inventors: Eberhard Correa, Freiburg (DE); Bertrand Koenig, Schiltigheim (FR)

(73) Assignee: Alcoa Architectural Products SAS, Merxheim (FR)

( * ) Notice: Subject to any disclaimer, the term of this patent is extended or adjusted under 35 U.S.C. 154(b) by 217 days.

(21) Appl. No.: 13/817,627

(22) PCT Filed: Aug. 19, 2011

(86) PCT No.: PCT/EP2011/064323
§ 371 (c)(1),
(2), (4) Date: Apr. 29, 2013

(87) PCT Pub. No.: WO2012/022808
PCT Pub. Date: Feb. 23, 2012

(65) Prior Publication Data
US 2013/0216796 A1     Aug. 22, 2013

(30) Foreign Application Priority Data
Aug. 19, 2010   (EP) ..................................... 10305901

(51) Int. Cl.
*B32B 3/10*       (2006.01)
*B32B 13/02*      (2006.01)
*B32B 13/04*      (2006.01)
(Continued)

(52) U.S. Cl.
CPC ............. *B32B 13/02* (2013.01); *B28B 19/0092* (2013.01); *B32B 3/10* (2013.01); *B32B 5/00* (2013.01); *B32B 5/18* (2013.01); *B32B 13/04* (2013.01); *B32B 13/08* (2013.01); *B32B 15/085* (2013.01); *B32B 27/065* (2013.01); *B32B 27/20* (2013.01); *C04B 28/26* (2013.01); *C09K 21/02* (2013.01); *B32B 2307/102* (2013.01); *B32B 2307/3065* (2013.01); *B32B 2307/712* (2013.01); *B32B 2419/00* (2013.01); *B32B 2605/18* (2013.01); *C04B 2111/00612* (2013.01); *C04B 2111/28* (2013.01); *C08K 3/22* (2013.01);
(Continued)

(58) Field of Classification Search
CPC ....................................................... B32B 13/02
See application file for complete search history.

(56) References Cited

U.S. PATENT DOCUMENTS 5,403,424 A  *  4/1995   Ehrat et al. ..................... 156/247
5,507,894 A      4/1996   Ehrat et al.

FOREIGN PATENT DOCUMENTS

| DE | 4317315 A1 | 12/1993 |
| EP | 0616985 A2 | 9/1994 |

OTHER PUBLICATIONS

International Search Report and Written Opinion in connection with PCT/EP2011/064323 dated Jan. 12, 2012 (14 pages).

*Primary Examiner* — David Sample
*Assistant Examiner* — Christopher Polley
(74) *Attorney, Agent, or Firm* — Greenberg Traurig, LLP

(57) ABSTRACT

The present invention relates to non-combustible composite panels, comprising two outer layers (24) and a core (10, 16). Moreover, the invention provides a method for manufacturing of non-combustible composite panels. The amount of organic ingredients within the core, is reduced insofar as to allow for a heat of combustion adequate to reach non-flammability, while providing sufficient flexibility for the composite panel. Magnesium hydroxide is implemented within the core to obtain extraordinary flame retardation. In order to manufacture the inventive composite panels a continuous press (34) is utilized replacing extruders (14) known by the state of the art.

10 Claims, 2 Drawing Sheets

Figure 1:
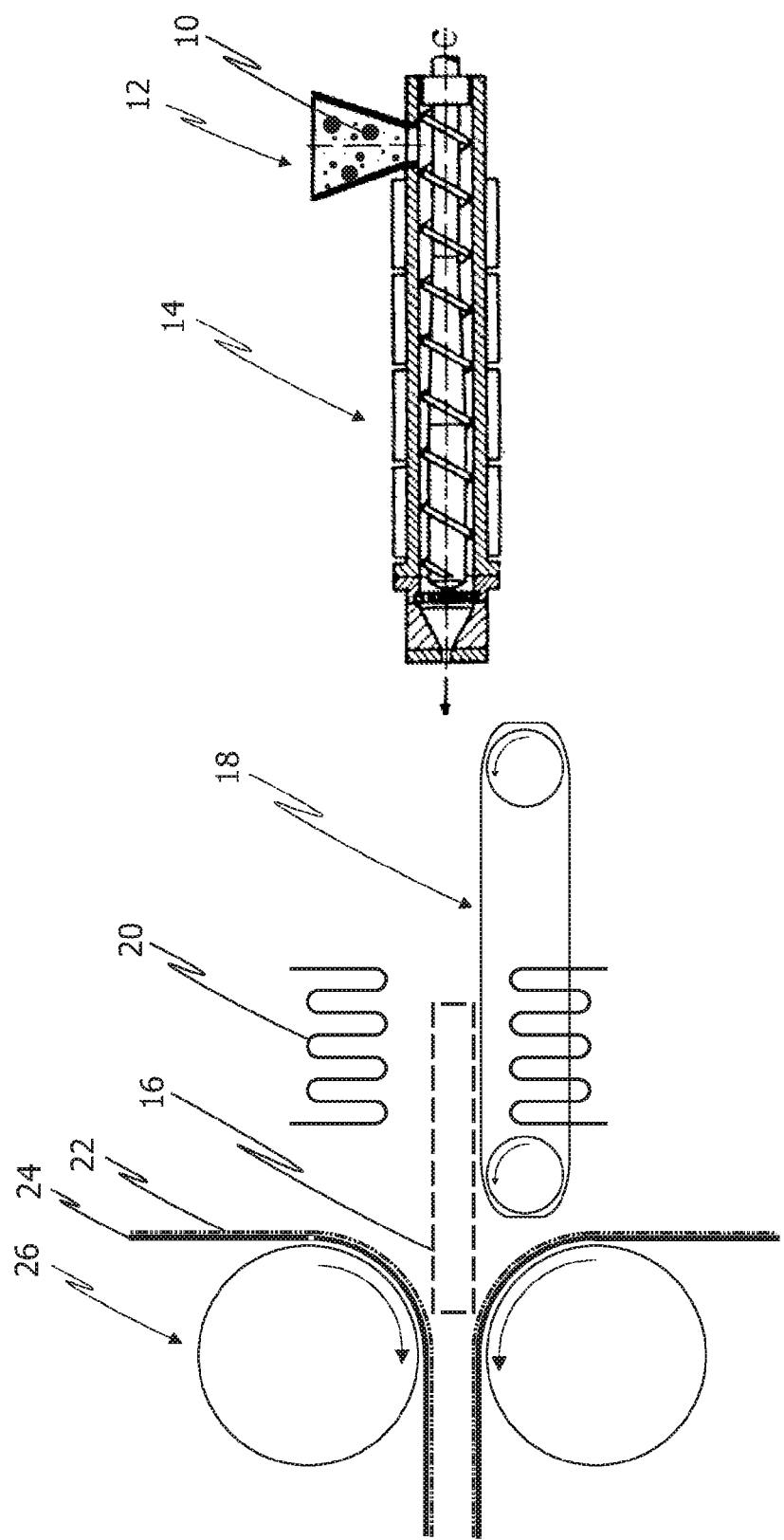

(51) Int. Cl.
*B32B 13/08* (2006.01)
*B32B 15/085* (2006.01)
*B32B 27/06* (2006.01)
*B32B 27/20* (2006.01)
*C04B 28/26* (2006.01)
*C09K 21/02* (2006.01)
*B28B 19/00* (2006.01)
*B32B 5/00* (2006.01)
*B32B 5/18* (2006.01)
*C04B 111/00* (2006.01)
*C04B 111/28* (2006.01)
*C08K 3/22* (2006.01)

(52) U.S. Cl.
CPC *Y10T428/24893* (2015.01); *Y10T 428/249974* (2015.04); *Y10T 428/258* (2015.01)

NON-COMBUSTIBLE COMPOSITE PANEL AND MANUFACTURING METHOD

The present invention relates to a composite panel according to the subject matter of independent claim 1. In particular, the present disclosure concerns a non-combustible composite panel, comprising two outer layers and a core. Moreover, the invention provides a method for manufacturing of such depicted composite panels.

Due to their exceptional mechanical properties, composite panels have a wide variety of application such as aircraft construction or architecture. In architecture, for instance, composite panels are used for external walls, shop awnings, signage and ceilings. Depending on their composition, composite panels can exhibit many advantageous features such as being weather proof, noise absorbing, fireproof, light and easy to cut, impact resistant and easy to maintain. Composite panels are also known as sandwich elements, as they commonly consist of a plurality of different layers arranged on top of each other. In many cases, composite panels exhibit at least three layers, in particular a core layer as well as two outer layers attached to either side of the core.

Above all, aluminium composite panels are utilized in architectural applications, such as the cladding of modern buildings. Although, aluminium composite panels are exceedingly light weight, they exhibit high durability and are easy to process. In consequence of their application in hospitals, tunnels and stadiums, however, there is a need for composite panels which are incombustible. This requirement is specified within the European-standard EN 13501-1. Depending on properties like fire performance, smoke generation, burning droplets etc. materials are classified in different categories. A general view of the different classes specified by the European standard, in comparison with the national standards in Germany and France, is depicted in table 1 (effective July 2010).

TABLE 1 overview European, German, French flammability classification

| Flammability | Europe (EN-13501) | Germany (DIN 4102) | France (NF-P92501) |
| --- | --- | --- | --- |
| Non-flammable | A1, A2-s1 d0 | A1, A2 | M0 |
| Low flammability | A2-S2 d0, B, C | B1 | M1, M2 |
| Moderate flammability | D, E | B2 | M3 |
| High flammability | F | B3 | M4 |

In order to provide a material that fulfils the criteria to be non-combustible, it must be classified as A1 or A2-s1 d0 (s:=smoke generation, d:=burning droplets), according to the European standard EN-13501. In this regard, the core material is subjected to various tests, such as the measurement of its calorific value, defined by ISO 1716. As to that, the requirement for a classification of non-flammability, according to the European standard, is a heat of combustion that does not exceed 3.0 MJ/kg. By contrast, the French standard even stipulates a heat of combustion no higher than 2.5 MJ/kg in order to obtain a "M0" classification for tested product.

Composite panels known from the state of the art comprise metallic or non-metallic strips that are attached to both sides of the core layer, usually by means of an adhesive. With regard to the aforementioned fire performance, these known composite panels frequently use inorganic and non-flammable materials in order to build the core layer. However, core layers of inorganic nature are comparatively heavy and lack flexibility, thus are not capable of absorbing the deformations resulting from mechanical stresses due to thermal expansions of the cover layers. Moreover, these panels often can not be processed as easily as composite panels exhibiting an organic layer.

In addition to the said inorganic composite panels, there are constructions known from the state of the art, having a core layer consisting of either purely organic or predominantly organic ingredients. A problem with these core materials is that the aforementioned requirements of flame resistance in order to be classified as non-combustible can not be met.

On the basis of the problems outlined above it is an object of the present invention to provide a non-combustible composite panel with two outer layers and a core, fulfilling European and French standards. Moreover, it is an aim to provide a core material which can be produced with a high throughput and a cheap price-rate, featuring excellent flexibility as well as easy processing.

To this end, the invention relates to a composite panel, comprising two outer layers and a core. The core consists of a mixture of individual materials including:

| | |
| --- | --- |
| 50 to 65% by weight | of magnesium hydroxide with an average particle size of 0.3 to 1.0 mm; |
| 15 to 25% by weight | of lightweight fillers; |
| 10 to 20% by weight | of magnesium hydroxide with an average particle size of 10 to 100 μm; |
| 5 to 10% by weight | of binders; |
| 0 to 2% by weight | of magnesium hydroxide with an average particle size of 1 to 10 μm; |
| 0 to 2% by weight | of tackifiers; |
| up to 3% by weight | of inorganic binders; and |
| up to 1% by weight | of stabilisers. |

The depicted core material, according to the present invention, exhibits various advantages compared to the mixtures known by the state of the art. In particular, the amount of organic ingredients, such as the bonding agents, is reduced insofar as to allow for a heat of combustion adequate to reach non-flammability, whilst providing sufficient flexibility for the composite panel.

Furthermore, the inclusion of magnesium hydroxide as a flame retardant within the core mixture provides a wide range of advantages. Fundamentally, magnesium hydroxide exhibits a considerably high endothermic effect, compared to analogous products. Also, magnesium hydroxide, which is a natural product, is considerably cheaper than other comparable, synthetically produced flame retardants, rendering a cheap and environmentally friendly production of the mixture possible. In addition, when magnesium hydroxide is heated, it forms water vapour, cooling the mixture down and extinguishing a potential fire within the composite panel. In comparison to other flame retardants, however, magnesium hydroxide starts forming water vapour at considerably higher temperatures. For this reason, the core material, according to the present invention, retains its ability to form water damp, resulting in a higher endothermic property of the core material, even though the production of the core might involve procedural steps at high temperatures. Therefore, the addition of magnesium hydroxide allows for the application of higher temperatures during fabrication, resulting in a higher throughput of the composite panels.

Even further, the core exhibits a certain distribution of magnesium hydroxide of different particle sizes, so as to avoid cavities within the core layer. In this regard, the mixture, according to the present invention, presents an exceedingly dense packing of the core ingredients, allowing for thin and flexible composite panels. Particularly, it is preferred to use magnesium hydroxide of three different particle sizes, roughly varying by a factor of ten in their average particle size. Moreover, the particle size of the magnesium hydroxide is directly related to the time needed to extinguish a fire, as smaller particles imply a faster formation of water vapour. For this reason, it is advantageous to add magnesium hydroxide of different particle sizes, in order to obtain a fast and consistent suppression of fires within the core.

With regard to the outer layers of the composite panel, according to the present invention, the outer layers can be any foil, film, strip or plate-shaped material. Conceivable materials may be any plastics or metallic materials. Preferred, however, are metallic materials such as iron, steel, zinc, tin, zinc-coated iron, copper, bronze, aluminium and aluminium alloys. Most preferably, both of the outer layers are made of aluminium alloys, although it is conceivable to use two different materials. In addition, the two outer layers may be joined to the core by means of an adhesive or bond-promotion agents.

As another core ingredient bonding agents are applied, representing 5 to 10 wt % of the core. Bonding agents are applied in order to hold the inorganic ingredients, such as the magnesium hydroxide particles together. Furthermore, they are applied to establish a connection between the core material and the two outer layers. Preferably, bonding agents are thermoplastics on a polyolefin basis, such as low, medium and high density polyethylene, polypropylene, atactic, isotactic, amorphous and crystalline polypropylene and any desired mixtures thereof.

Furthermore, the core material may include up to 2 wt % of tackifiers. These are chemical compounds used to increase the stickiness of the surface of the binders to obtain a better bounding between the different raw materials. By way of example, implemented tackifiers could include terpene phenole, rosin, phenolic resins, polybutene and hydrocarbon resins.

Additionally, the core mixture might include up to 3% of inorganic binders, in order to obtain a good homogeneity of the provided mixture before manufacturing of the actual composite panels. Also it is beneficial to employ stabilisers, representing 0 to 1 wt % of the core mixture. In particular, these stabilisers would be antioxidants, such as paraphenylenediamines or alkyl phenols, preventing oxidation of the binder and avoiding the link destruction between the ingredients of the mixture.

An especially preferred embodiment of the present invention includes a core that comprises:

| | |
|---|---|
| 55 to 60% by weight | of magnesium hydroxide with an average particle size of 0.3 to 1.0 mm; |
| 18 to 22% by weight | of lightweight fillers; |
| 13 to 18% by weight | of magnesium hydroxide with an average particle size of 10 to 100 µm; |
| 6 to 8% by weight | of binders; |
| 0 to 2% by weight | of magnesium hydroxide with an average particle size of 1 to 10 µm; |
| 0 to 2% by weight | of tackifiers; |
| up to 3% by weight | of inorganic binders; and |
| up to 1% by weight | of stabilisers. |

Accompanied by the reduction of organic ingredients, however, there has to be a change in the manufacturing process of the composite panels, according to the present invention. Fabrication processes known from the state of the art consist of an extruder, extruding the core material. This extrusion process can be done with heating of the raw core material. Subsequently, the extruded core panel is transferred to a pair of laminating rolls by means of a conveyor. By pressing the extruded core panel with the laminating rolls, the core panel with the two outer layers. During the transport from the extruder to the laminating rolls, the core material is heated up, so as to melt the bonding agents within the core material. The core panel is then introduced into the gap between the pair of laminating rolls, bonding the core panel with the two outer layers.

The problem with known manufacturing processes is the relatively low amount of organic ingredients within the inventive core material. According to this, it is not possible to extrude the inventive raw core material with an extruder, as most of the ingredients are rigid inorganic particles, instead of viscous thermoplastics.

Therefore, it is another objective of the present invention to provide a manufacturing process for composite panels. Furthermore, it is another object to depict a faster manufacturing process, which can be implemented in an economical manner.

For this purpose, the invention further relates to a manufacturing process as depicted in the subject matter of independent claim 10.

In particular, the method for manufacturing of a composite panel, comprising two outer layers and a core, includes a first step, wherein the core mixture is distributed onto a conveyor belt, by means of a scattering unit. Subsequently, in another step, the distributed core mixture is compressed to form a core panel of a predetermined thickness by means of a continuous press, wherein the core mixture is exposed to a thermal process during the compression. In a last step, the core panel is bonded with two outer layers by means of a press having a pair of laminating rolls. The laminating rolls may essentially be the same as the one utilized by the state of art.

The aforementioned inventive method shows several beneficial qualities. On one side, the method can be implemented making use of former machinery, known by the state of the art. In other words, the manufacturing devices used within the inventive method can be retrofitted to existing setups, economizing costs for installation of the machinery. Furthermore, the method allows for exceedingly high throughput by applying a thermal process to the core mixture, whilst compressing it to form a core panel. Therefore, composite panels, like the one according to independent claim 1, can be produced at much higher speed, considerably increasing the efficiency of the inventive fabrication method.

Moreover, the inventive method is not restricted to the production of non-combustible composite panels. Rather, it is also possible to form composite panels, known by the state of the art, including considerably higher amounts of organic ingredients, such as polyethylene. Compared to the processes for manufacturing of known composite panels, there is no need for the present invention to apply devices like an extrusion press or a pre-heat core oven anymore, as will be discussed in more detail below. Instead, the depicted method applies a first continuous press, carrying out heating and compression at the same time.

Further embodiments, according to the present invention, are described within dependent claims 2 to 9 and 11 to 15.

According to a further embodiment of the inventive composite panel, the core mixture includes polyethylene as a bonding agent. Polyethylene is made by copolymerization of ethylene with longer-chain olefins such as butene, hexene or octene. Polyethylene resins might be granules or pellets. It is very flexible and elongates under stress. Moreover, it provides excellent environmental stress resistance as well as good resistance to chemicals and to ultraviolet radiation. Alternatively, it is feasible to apply Polyethylene with additives like anhydride maleic, ethylene acrylic acid, silane or ethylene copolymer, resulting in improved binding between the inorganic and organic ingredients of the core mixture.

With regard to another implementation of the present invention, the core mixture of the composite panel includes sodium silicate as an inorganic binder. Sodium silicate, commonly known as "water glass" is a versatile, inorganic chemical made by combining various ratios of sand and soda ash. Additionally, it is an easy binder to use, as it does not require a drying oven. Sodium silicate water solutions exhibit excellent bind properties for solids, allowing for the formation of high insulation composite panels that tolerate high temperatures. Also, sodium silicate belongs to a group of intumescent materials, which swell as a result of heat exposure, resulting in an endothermic effect. Therefore, water glass not only provides for excellent connection between the core materials but also increases the fire retardancy of the core mixture.

In another realisation of the composite panel, according to the present invention, the core mixture further includes up to 15% by weight of aluminium hydroxide. As an alternative flame retardant, it is feasible to add aluminium hydroxide to the core mixture, having a considerably lower activation temperature than magnesium hydroxide. That is to say, aluminium hydroxide starts setting free water vapour significantly sooner than magnesium hydroxide. In particular, the activation temperature of aluminium hydroxide is about 180° C., whereas magnesium hydroxide remains stable until a temperature of about 300° C. is reached. Thus, by combining magnesium hydroxide and aluminium hydroxide within the core mixture, it is possible to create a core, having an optimally designed activation temperature distribution.

According to another implementation of the present invention, the core mixture of the composite panel further includes up to 1.5% by weight of smoke reducers. Smoke reducers are used for binding soot, thus reducing the amount of toxic smoke particles in the case of inflammation of a composite panel. By way of example, smoke reducers can be made of zinc borate, zinc chloride or ferrocenes, most preferably in the form of a powder. In particular, it is preferable to use zinc borate as a smoke reducer. For example, such zinc borates can include $2ZNO.(B_2O_3)_3.(H_2O)_{3.5}$, $2ZNO.(B_2O_3)_3$ or $4ZNO.B_2O_3.H_2O$.

In another embodiment of the inventive composite panel, the two outer layers comprise a film of bonding agent on their inner surface, which is connected to the core material. The film of bonding agent on the inner surface of the outer layers is a cheap and reliable possibility to connect the outer layers to the core material. The film of bonding agent is heated up to a temperature of about 180° C. before contacting the core material, which has temperature of 100° C. Advantageously, the bonding agent on the inner surface of the outer layers is the same as the bonding agent within the core material. Thus, when pressing the layers together the hot and viscous bonding agents, which are applied on the outer layers or within the core material respectively, couple and provide for a connection of the two outer layers to the core material.

With regard to a further realisation the composite panel, according to the present invention, has a total thickness between 2 mm and 8 mm, in particular 3 mm to 6 mm. Due to its thin structure, the composite panel exhibits high flexibility, allowing them to withstand environmental influences such as wind and changing temperatures. Moreover, the comparatively thin composite panels are lightweight and thus are easy to handle. This is advantageous in view of the assembling process on building sites, especially in the case of an application as facade panels.

According to another implementation, the inventive composite panel further comprises a printed layer coating on an outer surface of at least one of the two outer layers. A printed layer coating offers a wide range of applications to the composite panel, as each costumer is free to choose his individual panel design. As an example, composite panels with a printed layer on the outer surface could be used as signs at a fuel station, where it is essential to apply non-combustible materials. Of course, it would also be possible to utilise spray-painting or sticky foil in order to coat the outer surface of the outer layers.

With reference to a further advantageous realisation, the composite panel further comprises a protective layer applied on the outer surface of at least one of the two outer layers. This layer protects the composite panel of environmental influence, such as the ultraviolet radiation or hail. In addition, it can serve as a protection during assembly of the composite panels. In particular, the protective layer can be permanently fixed to the composite panel or, more preferably, it can be attached to provide protection as long as the panels are not mounted.

In another embodiment of the inventive composite panel, the core mixture includes foam glass as lightweight filler. Foam glass is a lightweight material manufactured from recycled glass, which is extremely fine-pored expanded glass with millions of hermetically sealed pores. Since no diffusion can take place, the material is watertight and achieves an efficient barrier against convection. Besides the outstanding mechanical and thermal properties of the product, foamed glass manufacture is an exemplary process for waste recycling on an industrial basis. Foam glass can be manufactured fully out of waste glass, with only a minimum of additives. Thus, foam glass is a cheap and environmentally friendly additive, which is especially suitable in order to increase thermal insulation of the composite panel. According to this, composite panels with foam glass as a lightweight filler are particularly useful for facade applications.

With regard to an advantageous realisation of the inventive method, the core mixture is heated, during the thermal process, to a temperature higher than 200° C. With increasing temperature, the time needed in order to melt the binders within the core mixture, decreases. Therefore, less time is needed to compress the core mixture to a core panel, allowing for faster movement of the conveying belt, resulting in a higher throughput of the fabrication. It is important to note, however, that the compression at temperatures higher than 200° C. relies on an exclusive application of magnesium hydroxide, as a flame retardant within the core material. At such high temperatures, other flame retardants would loose their ability to absorb the heat or distinguish fires respectively.

In another implementation, the method includes that the core panel leaves the continuous press with a temperature of about 100° C. After leaving the continuous press, the core panel is inserted into gap between the pair of laminating rolls, where it is connected to the two outer layers. In order to obtain connection between the outer layers and the core panel it is necessary that the bonding agents are melted. Thus, the bonding agents connect to the inner surface of the outer layers, attaching them to the core panel permanently.

According to another step of the method for manufacturing of composite panels, according to the present invention, the composite panel is cut into pieces of arbitrary length, after leaving the press having the pair of laminating rolls. Due to this, the length of the fabricated composite panels can be adjusted by the needs of the costumer, without producing overmuch production scrap. Therefore, less waste of material and energy results in higher cost-efficiency.

In a further realisation of the inventive method, the core mixture is compressed by an isochoric process within the first continuous press. Composite panels, according to the present invention are produced with very low tolerances. In particular, the provision of tolerances of +/−0.1 mm in thickness is generally necessary. In this context, an isochoric process serves outstanding reproducibility and accuracy. Furthermore, isochoric continuous presses are considerably cheaper than their isobaric equivalent. Thus, this process allows for an accurate production of the composite panel, whilst applying low-cost devices.

With regards to a further variation of the method for manufacturing of composite panels, the amount of the core mixture entering the continuous press is defined by conveying the core mixture through a feed roller. In many cases, after the core mixture is spread onto the conveyor belt by the scattering unit, it has to be further distributed in order to obtain a homogeneous surface before entering the first continuous press. Also, by conveying the core mixture through a pre-compression roller, a homogeneously thick layer of core mixture is obtained on the conveyor belt. In particular, this layer might have a thickness of about 6 mm, which is subsequently being compressed to a thickness of 3 mm by the continuous press. Preferably, the pre-compression roller, being affixed above the conveyor belt, is adjustable in its vertical position by means of a controlling device, so as to be able to obtain various thicknesses of the layer of core mixture.

In the following, the inventive method for manufacturing composite panels is explained in more detail, with reference to the exemplary embodiment shown.

Figure 2:
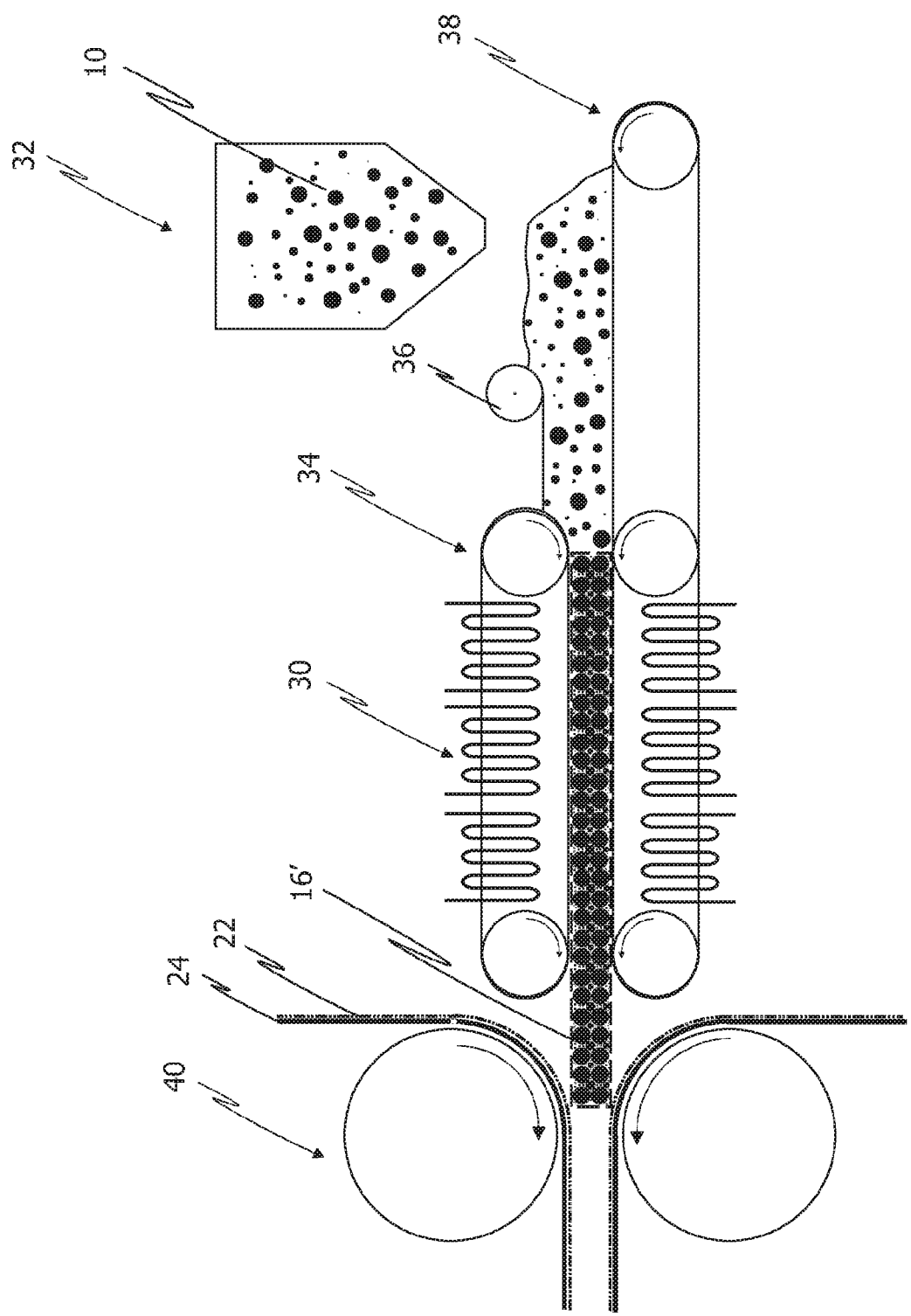

The Figures show:

FIG. 1 a schematic view of an apparatus for manufacturing composite panels according to a method known by the state of the art; and FIG. 2 a schematic view of an apparatus for manufacturing composite panels according to the inventive method.

FIG. 1 shows a schematic view of an apparatus for manufacturing composite panels according to a method known by the state of the art. In a first step, the core mixture 10, inserted into a hopper 12, is extruded to form a core panel 16 by means of an extruder 14. Subsequent to the extrusion of the core mixture 10 within the extruder 14, the so formed core panel 16 is transported to a press 26 with the aid of conveyors 18. The press 26 is constituted by a pair of laminating rolls.

During the transportation of the core panel 16 along the conveyors, the core panel 16 is heated by a pre-heat core oven 20. In the next step, the heated core panel 16 is inserted into the gap between the pair of laminating rolls of the press 26, bonding the core panel 16 with two out layers 24. As shown in FIG. 1, the press 26 consists of laminating rolls, carrying the two outer layers 24 for attachment to the core panel 16. Each of the two outer layers 24 comprises a film 22 of bonding agent on its inner surface. The inner surface of the outer layers 24 is then brought in contact with the heated core panel 16, by applying pressure on top and bottom of the core panel 16. As a consequence, the warm and melted bonding agents on the core panel 16 and on the inner surface of the two outer layers 24 combine and establish a strong connection after the composite panel is cooled down.

The problem with the manufacturing processes described with reference to FIG. 1 is the relatively low amount of organic ingredients within the inventive core mixture. According to this, it is not possible to extrude the raw core material with an extruder, as most of the ingredients are rigid inorganic particles, instead of viscous thermoplastics.

Due to this, the inventive method, schematically shown in FIG. 2, does not include an extruder 14. Instead, the raw core mixture 10 is feed into a scattering unit 32. In a first step, the scattering unit distributes a core mixture 10 onto a conveyor belt 38. The distributed core mixture 10 is then transported to a continuous press 34, which is designed to compress the core mixture in such a way as to form a continuous core panel 16' of a predetermined thickness. The continuous press 34 is designed as a double belted press. Simultaneously with the compression, the core mixture 10 is exposed to a thermal process.

The so formed continuous core panel 16' is then bonded with the two outer layers by means of a second press 40, which comprises a pair of laminating rolls which may be of the same kind as the laminating rolls, utilised in accordance with the method known by the state of the art.

The aforementioned thermal process within the continuous press 34 is conducted by a heater assembly 30. In order to increase the throughput of the fabrication process, the core mixture 10 is heated to a temperature higher than 200° C., in a first step. With increasing temperature, the time needed in order to melt the binder within the core mixture decreases. Therefore, less time is needed to compress the core mixture 10 to a continuous core panel 16', allowing for faster movement of the conveying belt 38, resulting in a higher throughput of the production.

Advantageously, the continuous press 34 can be an isochoric press. An isochoric press serves an outstanding reproducibility and accuracy, rendering the production of low tolerances for the thickness of the continuous core panel 16' possible.

After the compression at high temperatures, the continuous core panel 16' can be cooled down by the heater assembly 30, so as to leave the continuous press 34 with a temperature of about 100° C. This is because, after leaving the continuous press 34, the continuous core panel 16' is inserted into the pair of laminating rolls. As mentioned before, in order to obtain connection between the outer layers 24 and the core panel 16 it is necessary that the binder within the core is melted. Subsequent to the second press 40, the continuous core panel 16' can be cut into pieces of arbitrary length.

Furthermore, in order to obtain a homogenously thick layer of core mixture 10, the amount of the core mixture 10 entering the continuous press 34 can be defined by conveying the core mixture 10 through a pre-compression roller 36. In many cases, after the core mixture is spread onto the conveyor belt by the scattering unit, it has to be further distributed in order to obtain a homogeneous surface before entering the continuous press 34. In particular, this layer might have a thickness of about 6 mm, which is subsequently being compressed to a thickness of 3 mm by the continuous press 34. Preferably, the pre-compression roller 36, being affixed above the conveyor belt 38, is adjustable in its vertical position by means of a controlling device, so as to be able to obtain various thicknesses of the layer of core mixture 10.

It has to be noted that the method according to present invention is not limited to the production of non-combustible composite panels as depicted by claims 1 to 10. Rather, the depicted method is also applicable for the fabrication of the composite panel known by the state of the art. In this case, an extruder 14 is not necessary, making it possible to produce different composite panels with one setup.

The invention claimed is:

1. A composite panel, comprising two outer layers and a core, the core consisting of a mixture of individual materials including:

a first kind of magnesium hydroxide, the first kind of magnesium hydroxide having an average particle size of 0.3 to 1.0 mm;

a second kind of magnesium hydroxide, the second kind of magnesium hydroxide having an average particle size of 10 to 100 µm;
a third kind of magnesium hydroxide, the third kind of magnesium hydroxide having an average particle size of 1 to 10 µm;
15 to 25% by weight of fillers;
5 to 10% by weight of binders;
0 to 2% by weight of tackifiers;
up to 3% by weight of inorganic binders; and
up to 1% by weight of stabilisers,
wherein the core mixture includes 50 to 65% by weight of the first kind of magnesium hydroxide, 10 to 20% by weight of the second kind of magnesium hydroxide, and no more than 2% by weight of the third kind of magnesium hydroxide,
wherein the core mixture further includes up to 15% by weight of aluminum hydroxide, and
wherein the second kind of magnesium hydroxide and the third kind of magnesium hydroxide have non-overlapping particle sizes.

2. The composite panel according to claim 1, wherein the core consisting of a mixture of individual materials includes:
55 to 60% by weight of the first kind of magnesium hydroxide;
18 to 22% by weight of fillers;
13 to 18% by weight of the second kind of magnesium hydroxide;
6 to 8% by weight of binders;
0.5 to 2% by weight of the third kind of magnesium hydroxide;
0 to 2% by weight of tackifiers;
up to 3% by weight of inorganic binders; and
up to 1% by weight of stabilisers.

3. The composite panel according to claim 1 or 2, wherein the core mixture includes polyethylene as a binder; and/or wherein the core mixture includes sodium silicate as an inorganic binder.

4. The composite panel according to one of claim 1 or claim 2, wherein the core mixture further includes up to 1.5% by weight of smoke reducers.

5. The composite panel according to claim 4, wherein the composite panel includes a zinc borate as a smoke reducer.

6. The composite panel according to claim 1 or claim 2, wherein the two outer layers comprise a film of bonding agent on their inner surface, which are connected to the core material.

7. The composite panel according to claim 1 or claim 2, wherein the composite panel has a total thickness between 2 mm and 8 mm.

8. The composite panel according to claim 1 or claim 2, wherein the composite panel further comprises a printed layer coating on an outer surface of at least one of the two outer layers.

9. The composite panel according to claim 1 or claim 2, wherein the composite panel further comprises a protective layer applied on the outer surface of at least one of the two outer layers.

10. The composite panel according to claim 1 or claim 2, wherein the core mixture includes foam glass as a filler.

* * * * *